United States Patent
Pierce et al.

[19]

[11] Patent Number: 6,006,651
[45] Date of Patent: Dec. 28, 1999

[54] SPRING BRAKE ACTUATOR WITH FILTERED SERVICE VENT OPENING

[75] Inventors: William C. Pierce; William J. Hicks, both of Muskegon; Steven M. Stojic, Holland, all of Mich.

[73] Assignee: Neway Anchorlok International, Inc., Muskegon, Mich.

[21] Appl. No.: 08/922,817

[22] Filed: Sep. 3, 1997

Related U.S. Application Data

[60] Provisional application No. 60/016,615, May 1, 1996.

[51] Int. Cl.⁶ .................................................... F01B 7/00
[52] U.S. Cl. ........................................... 92/63; 92/130 A
[58] Field of Search ................... 303/9.76, 71; 188/170; 92/48, 63, 130 A

[56] References Cited

U.S. PATENT DOCUMENTS

| | | | |
|---|---|---|---|
| 3,730,056 | 5/1973 | Swander, Jr. | 92/48 |
| 3,977,308 | 8/1976 | Swander, Jr. et al. | 92/63 |
| 4,889,037 | 12/1989 | Goral et al. | 92/130 A |
| 5,518,304 | 5/1996 | Sich et al. | 303/28 |
| 5,623,862 | 4/1997 | Hanaway et al. | 92/48 |

FOREIGN PATENT DOCUMENTS

| | | |
|---|---|---|
| 32 39 971 | 5/1984 | Germany . |
| 32 41 548 | 5/1984 | Germany . |
| 47-9644 | 3/1972 | Japan . |
| 49-127328 | 12/1974 | Japan . |
| 57-179565 | 11/1982 | Japan . |
| 58-187634 | 12/1983 | Japan . |
| 63-53159 | 3/1988 | Japan . |
| 7-31541 | 6/1995 | Japan . |
| 7-29117 | 11/1995 | Japan . |

*Primary Examiner*—Robert J. Oberleitner
*Assistant Examiner*—Mariano Sy
*Attorney, Agent, or Firm*—Rader, Fishman & Grauer PLLC

[57] ABSTRACT

A fluid-operated brake actuator having a housing with one or more vent openings in communication with an interior chamber is provided with a filter assembly mounted to the housing over the vent openings. The filter assembly includes a gas permeable filter element, with oleophobic and homophobic characteristics so that air entering the service brake inner chamber from the atmosphere will be substantially free of contaminants

27 Claims, 7 Drawing Sheets

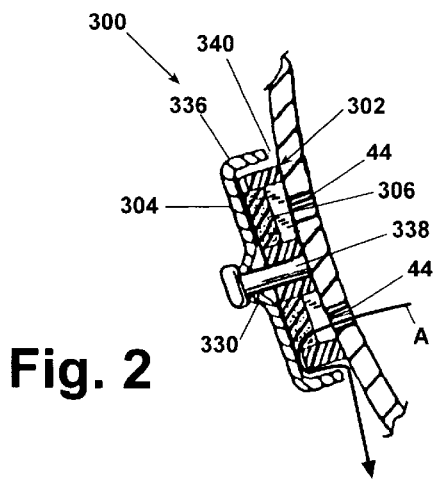
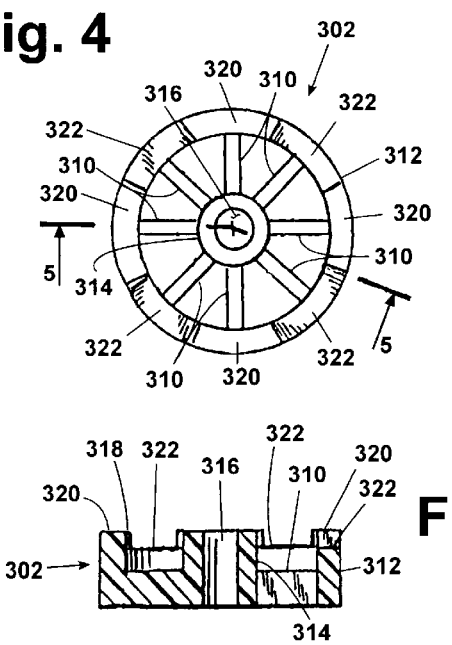
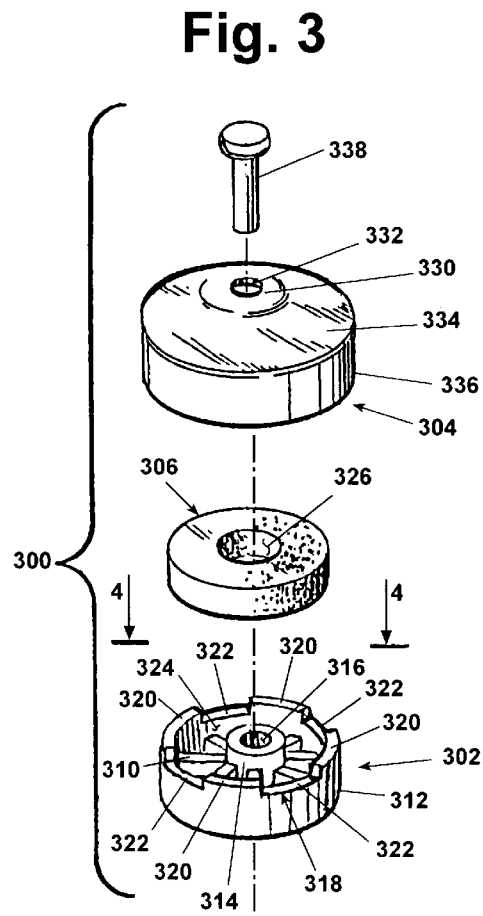
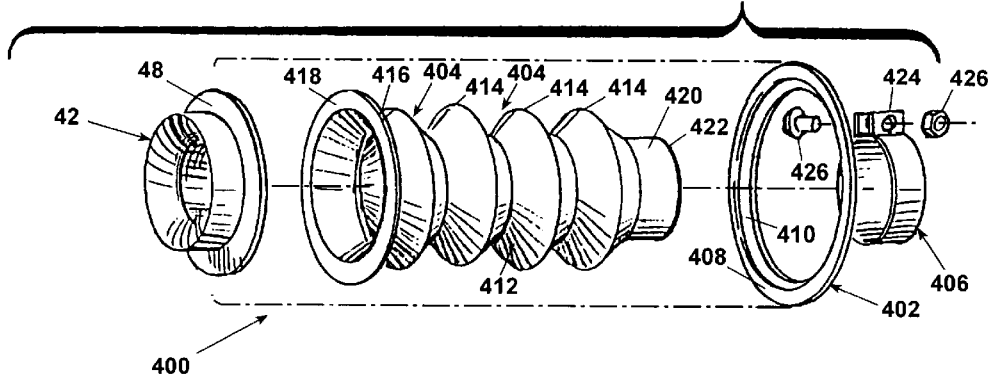

SPRING BRAKE ACTUATOR WITH FILTERED SERVICE VENT OPENING

CROSS-REFERENCE TO RELATED APPLICATIONS

This application is a 371 filing of International Application Ser. No. PCT/US97/07202 dated Apr. 30, 1997, which claims priority from U.S. application Ser. No. 60/016,615, filed May 1, 1996.

BACKGROUND OF THE INVENTION

1. Field of the Invention

The invention relates to air-operated diaphragm brakes for vehicles and particularly to combination service and spring brake actuator assemblies.

2. State of the Prior Art

An air brake system for a vehicle such as a bus, truck or the like typically includes a brake shoe and drum assembly which is actuated by means of an actuator assembly operated by the selective application of compressed air. Conventional air brake actuators have both a service brake actuator for actuating the brakes under normal driving conditions by the application of compressed air and a spring-type emergency brake actuator which causes actuation of the brakes when air pressure has been released. The emergency brake actuator includes a strong compression spring which forces application of the brake when air is released. This is often referred to as the spring brake.

Typically, the spring brake actuator is disposed in tandem with the service brake actuator. When full pressure is applied to the spring brake actuator, air pressure acting against a diaphragm compresses the compression spring. A spring brake actuator rod is held in a retracted position by a relatively small return spring, thus not affecting the operation of the brake. When the brake is to be applied during normal driving operation, compressed air is provided to the service brake actuator which, acting against a diaphragm, causes a service brake push rod to be extended and causes the brakes to be applied with an application force which is proportional to the air pressure applied to the service brake actuator. In the event of a loss of air pressure or an intentional exhaustion of air from the spring brake actuator, the brake will be mechanically activated by the force of the compression spring acting on the spring brake actuator rod which in turn acts upon the service brake push rod to apply the brakes. Thus, the spring brake portion serves both as a parking brake and an emergency brake.

In a typical prior art air brake system, the spring brake actuator and the service brake actuator are disposed in a single housing comprising a spring brake portion and a service brake portion. The service brake portion includes an air chamber partially defined by a flexible service diaphragm acting against a service brake push rod and a return spring to assure proper release of the brake when air is exhausted from the air chamber. The spring brake portion includes a spring chamber and an air chamber, both partially defined by a spring brake diaphragm acting against a spring pressure plate to compress the compression spring in the spring chamber when air pressure is applied to the spring brake diaphragm in the air chamber. An actuating rod extends through the spring brake diaphragm to integrally connect with the pressure plate. In operation, it is pushed outwardly from the air chamber through a housing opening and bearing provided with a pneumatic seal to engage the service diaphragm and push rod of the service brake, thereby causing the brake to be applied. The spring brake diaphragm is provided with a centrally disposed aperture having an annular edge and the actuator rod extends through the opening and engages the annular edge to form an airtight seal. The actuator rod is hollow with a central bore and a brake releasing caging bolt extends into the central bore. An end plate on the bolt engages the spring brake pressure plate to draw the spring to a compressed state when the spring is caged by rotation of the bolt.

The service chamber on the service side of the service brake diaphragm is typically vented to the outside atmosphere to allow air to be exhausted from that portion of the housing when the diaphragm is actuated by introduction of compressed air to the opposite side of the service brake diaphragm. When the service brake diaphragm expands, the diaphragm is moved in a direction so as to reduce the size of the service chamber which expels air out of the service chamber and through the vented openings in the service chamber. When the introduction of the compressed air is removed, the service brake return spring returns the diaphragm to its unexpanded position. This movement can cause air to be returned to the service chamber. Since the service chamber is vented to the outside atmosphere under the truck chassis, the outside air drawn into the service chamber is often accompanied by moisture and corrosive substances, such as road salt. Because the return spring wears as it cycles and its bare metal becomes exposed as a result, the return spring can corrode due to contaminants in the air. Also, because the service brake return spring must exert substantial force in order to return the service diaphragm to its unexpanded position, the service brake return spring can be subjected to large stresses when it cycles. The spring life is inversely proportional to the amount of corrosion and stress it experiences. In sealed housings, the spring cannot be removed from the housing without permanently deforming the housing. In other housings, the actuator must be replaced by a new actuator and the old actuator sent to a rebuilder. In any case, the actuator is not serviceable by the truck operator. Often the entire brake actuating unit must be replaced when the service chamber needs repair. A prior, commonly-assigned U.S. application, SEALED BRAKE ACTUATOR WITH FILTERED VENT OPENINGS, International Application No. PCT/US95/02151, filed Feb. 21, 1995, discusses the advantages of sealing the spring brake chamber against the introduction of corrosive substances and is incorporated into this application by reference. There remains the problem of sealing the service side of a fluid brake actuator.

SUMMARY OF THE INVENTION

A brake actuator according to the present invention addresses the problem of contaminated air in the service chamber by providing a filter assembly over one or more vent openings in the housing wall. When the elastomeric diaphragm is expanded to actuate the brake, air is exhausted from the service chamber through the vent openings to atmosphere, simultaneously cleaning the filter assembly. Conversely, when the return spring is expanded to return the elastomeric diaphragm to its original position, as when the service brake is released, atmospheric air is drawn through the filter assembly and the vent openings into the service chamber, with any contaminants in the air being removed from the air by the filter assembly. Consequently, air in the service chamber is maintained substantially free of contaminants, thereby protecting the service brake interior from corrosion. As a result, the useful service life of the brake actuator assembly is extended considerably.

In accordance with one embodiment of the invention, vent openings are provided in the housing in communication with the service brake inner chamber and a gas permeable filter element covers the vent openings. An outer frame assembly covers the filter element. Preferably, the outer frame assembly defines tortuous air passages from the filter element to the exterior of the housing.

Preferably, the filter element is a hydrophobic, oleophobic gas permeable membrane of expanded PTFE. In another aspect of the invention, the filter element can be installed between a frame and a shell. The frame can comprise an element having radial spokes and an upstanding peripheral rim. The filter element can be disc-shaped and installed within the upstanding peripheral rim of the frame element whereby the reciprocation of the moveable diaphragm causes air to be cycled to and from the brake chamber through the filter assembly which keeps the chamber substantially free of contaminants.

In another embodiment of the invention, the actuator rod for the service brake extends through an opening in the brake housing which is the principal opening for air to enter or exit the brake chamber. A filter assembly is mounted to the housing which surrounds the opening and is adapted to filter air moving in and out of the housing as the actuator rod reciprocates. Preferably, the filter element have similar properties as the filter element of the previous embodiment and can comprise a flexible boot covering the opening and having the filter element disposed therein. In a further aspect of the invention, the flexible boot comprises a bellows member provided with at least one accordion-style fold having an aperture therein covered by a filter element.

Further, this invention contemplates the use of a filter assembly to cover housing openings in various types of fluid-actuated brakes including movable diaphragm, rolling lobe and piston-style brakes.

BRIEF DESCRIPTION OF THE DRAWINGS

FIG. 2 is a cross-sectional view of a spring brake actuator similar to FIG. 1 showing the enlarged region 2 of FIG. 1;

FIG. 3 is an exploded perspective view of the filtered service side vent assembly of FIG. 1;

FIG. 4 is a plan view of a frame portion of the filtered vent assembly according to the invention, taken along lines 4—4 of FIG. 3;

FIG. 5 is a cross-sectional view of the frame portion of the filtered vent assembly taken along lines 5—5 of FIG. 4;

FIG. 6 is an exploded view of a bellows assembly located at the bottom portion of the spring brake actuator of FIG. 1;

DESCRIPTION OF THE PREFERRED EMBODIMENTS

Figure 1:
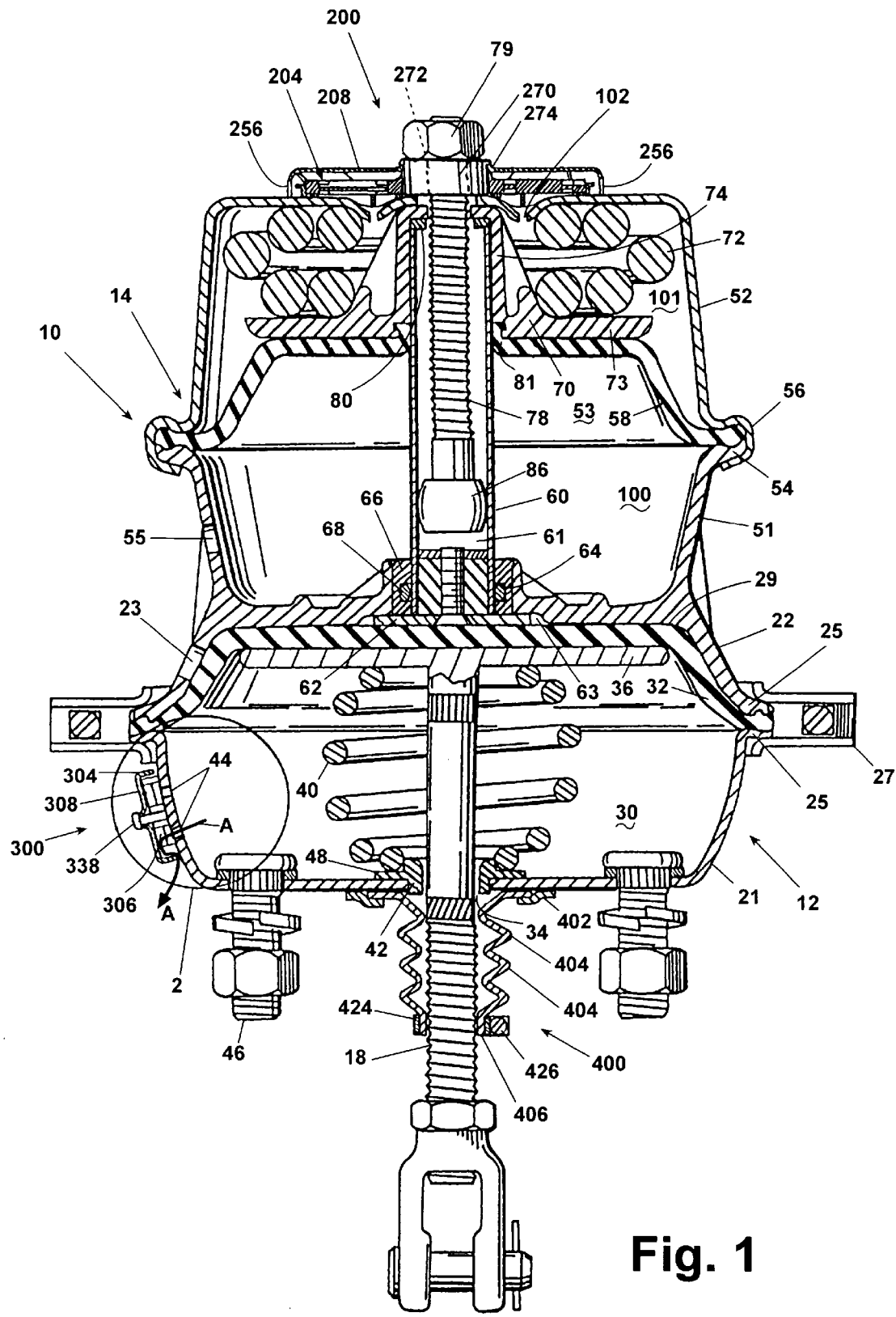
FIG. 1 is a cross-sectional view of a spring brake actuator with a filtered service side vent assembly according to the invention.

FIG. 1 shows a cross-sectional view of an air-operated brake actuating unit 10 having a general configuration well known in the art. The actuating unit 10 comprises a service brake portion 12 mounted in tandem to a spring brake or emergency brake portion 14. A service brake push rod 18 extends from the service brake 12 and is adapted to operably connect to a conventional brake shoe and drum (not shown in the drawing) in a standard fashion. Reciprocating motion of the push rod 18 will cause the brake to be alternately applied and released.

The service brake 12 comprises a pair of facing cup-shaped housing sections 21 and 22, each having an outwardly directed flange edge 25. The housing sections 21,22 are clamped together at their flange edges by means of a clamp 27. An elastomeric diaphragm 32 is compressed at the peripheral edge thereof between flange edges 25 of the housing sections 21, 22. A first chamber 29 is thus activated between the housing section 22 and the elastomeric diaphragm 32 and a second chamber 30 is defined between the housing section 21 and the elastomeric diaphragm 32. The service brake push rod 18 extends through a central opening 34 in housing section 21 and into the second chamber 30 where it terminates in a pressure plate 36. A return spring 40 extends between the pressure plate 36 and the interior surface of the housing section 21. A push rod guide 42 mounted to housing section 21 defines the central opening 34 and has a spring seat 48 which receives one end of the compression spring 40 to retain it in position around the opening 34. The spring 40 thus tends to urge the pressure plate 36 and the service brake push rod 18 to a fully retracted position shown in FIG. I wherein the first chamber 29 is collapsed.

To operate the service brake, compressed air is introduced into the first chamber 29 through an air service port 23 in housing section 22 to force the diaphragm 32 and the pressure plate 36 against the force of the spring 40 to actuate the push rod 18. Openings 44 are provided in the housing section 21 to permit the rapid evacuation of air from the second chamber 30 as the brake is actuated such that the air exits the second chamber 30 through a filter assembly 300. A bellows assembly 400 is provided at the opening 34 to capture any air which escapes past the push rod guide 42. Mounting studs 46 are provided to mount the brake actuating unit 10 onto a vehicle.

The spring brake 14 comprises a pair of facing cup-shaped housing sections 51, 52 joined at their edges to form an inner chamber 53. Typically, housing sections 22, 51 are formed of an integral cast piece. Housing section 51 is provided with an outwardly directed circumferential flange edge 54. The housing sections 51 and 52 are clamped together by means of a peripheral curved edge 56 on housing section 52 engaging edge 54 on housing section 51. an elastomeric diaphragm 58 is suspended within the inner chamber 53 and is compressed at its peripheral edge between the edges 54, 56 of the housing sections 51, 52. The portion of the inner chamber 53 between the diaphragm 58 and the housing section 51 forms an air chamber 100 which is filled with compressed air typically supplied through an air service port 55 in housing section 51 when the emergency brake is in its normal, released position. The portion of inner chamber 53 between the diaphragm 58 and housing section 52 defines a compression spring chamber 101, containing a large-force spring brake compression spring 72.

An actuator rod 60, aligned with the push rod 18, has a distal end extending through a central opening 64 in an end wall of housing section 51. The distal end of actuator rod 60 terminates in a reaction plate 62 disposed in an annular seat 63 in an end wall of housing section 22. The opening 64 is provided with a bearing 66 having at least one annular recess which accommodates at least one O-ring seal 68. The bearing 66 defines a bearing surface for actuator rod 60, and the O-ring 68 seals the pressure chamber in the service brake 12 from the air chamber 100 in the spring brake 14. The proximal end of the actuator rod 60 extends through a centrally disposed aperture 81 in the diaphragm 58 and terminates in a pressure plate 70 which engages the spring brake compression spring 72. The pressure plate 70 comprises a substantially flat portion 73 engaging one end of the spring 72 and a tubular portion 74 extending generally axially along the axis of the spring 72. The tubular portion 74 is press-fit onto an end portion of the actuator rod 60 such that the pressure plate 70 and the actuator rod 60 form an integral unit. An annular recess 76 in an end wall of the housing section 52 serves as a seat for the spring 72 and also provides rigidity to the end wall against the force of the spring 72.

During normal operation of the brake actuator 10, the actuator rod 60 will be in the fully retracted position, as depicted in FIG. 1, by means of compressed air which is maintained in the air chamber 100. When the compressed air is exhausted, the compression spring 72 forces the pressure plate 70 and the rod 60, integrally attached to the pressure plate, in the direction of the brake push rod 18 of the service brake 12. The force of the spring 72, when released, causes the actuator rod 60 to be extended through the central opening 64 which, in turn, causes the reaction plate 62 to apply a force to the diaphragm 32 and the pressure plate 36 of the service brake 12. This action causes the service brake push rod 18 to be actuated and the brake to be applied. When the emergency brake is to be released, compressed air is once again introduced into the air chamber 100. The force of the compressed air against the diaphragm 58 urges the pressure plate 70, the rod 60, and the spring 72 toward the retracted position depicted in FIG. 1.

The actuator rod 60 preferably is a hollow tube or rod provided with a central bore 61 to accommodate a brake release caging rod or tool 78. The distal end is closed by the reaction plate 62, but the proximal end is open, and an aperture is provided in the pressure plate 70 to permit the caging rod 78 to extend therethrough. The caging rod 78 is used to manually release the spring brake or to ensure that the compression spring 72 will remain compressed (or caged) when maintenance functions are performed on the brake assembly. The caging rod 78 preferably is a bolt or the like threaded into a fixed threaded opening such as the threaded collar 77 affixed by welding to the end wall of housing section 52. A hex-head nut 79 is fixedly attached to the caging rod 78 to facilitate threading the bolt into and out of the chamber 14 by a common wrench or the like. The end of the caging rod 78 within the actuator rod 60 has an enlarged head or plate 86.

An inwardly directed annular shoulder 80 in the tubular section 74 provides positive engagement with the actuator rod 60 when the rod is actuated and further serves as an engagement surface for the caging rod head 86 against which the caging rod head 86 will bear when the caging rod 78 is withdrawn. Upon withdrawal, the caging rod 78 retains the compression spring 72 in its compressed or caged state. Otherwise, the caging rod 78 extends into the central bore 61 of actuator rod 60 by a sufficient distance to allow the actuator rod 60 to extend its full length of travel without engagement between the shoulder 80 and the caging rod head 86.

FIGS. 1 and 2 further show the filter assembly 300 disposed over the vent openings 44 in the housing section 21 in a manner which defines a tortuous air path identified by the arrow A extending between the second chamber 30 and the exterior atmosphere. Each opening 44 (of which there may be several) is covered by one or more filter assemblies 300. This structure effectively requires all of the air entering and exiting the chamber 30 to go through a filter assembly 300, while simultaneously protecting the openings 44 and the second chamber 30 from dirt, debris, ice accumulation, paint, salt and the like. It will be understood that as air is drawn into the chamber 30 when the return spring 40 expands, contaminants in the atmosphere will be trapped by the filter assembly 300. Conversely, as air is expelled from the chamber 30 when the service diaphragm 32 expands due to the introduction of compressed air or by action of the spring brake 14, it is forced back through the filter 300 and will effectively clean it, expelling the contaminants into the atmosphere. Thus, the interior of the second chamber 30 is maintained substantially free of contaminants, regardless of operation of the spring brake. One or more filter assemblies 300 can be disposed around the exterior of the housing 21 depending upon the number of vent openings 44 present. As shown in FIG. 1 and in greater detail in FIGS. 2 and 3, the filter assembly 300 comprises a frame 302 and a cover plate 304 with a filter element 306 retained therebetween.

The frame 302 comprises an open grid defined by radially-extending spokes 310 which terminate at an axially-extending annular wall 312. The inner ends of the radial spokes 310 are secured to a cylindrical hub 314 surrounding a central bore 316. One annular edge 318 includes several equal-sized stepped portions 320 in spaced relationship which define several intermittent notches 322. The annular space between the exterior surface of the cylindrical hub 314 and the interior surface of the annular wall 312 defines a filter-receiving area 324. Preferably, the frame 302 is injection-molded of a relatively soft polymer such as Hytrel, typically 40 durometer on the Shore-D Scale or equivalent. Thus, the inner frame 302 has some flexibility.

As shown in FIGS. 2–3, the filter element 306 is an annular gas-permeable disc preferably constructed from a porous polymer having hydrophobic and oleophobic properties and a pore size of about one micron. An acceptable filter element comprises a treated, expanded polytetrafluoroethylene (PTFE), available from W. L. Gore and Associates and sold under the brand name Gore-Tex®. The filter element 306 has a central aperture 326 sized identically to the outside diameter of the central hub 314 of the frame 302 and an outer edge which corresponds to the interior diameter of the annular wall 312 such that the filter element 306 is fittingly received within the filter-receiving area 324 of the frame 302.

The cover plate 304 is a dish-shaped, stamped metal plate comprising a central rounded protrusion 330 having a central aperture 332 and tapering downwardly into a flat circular plate portion 334 which further terminates at a cylindrical shell 336 extending outwardly from a circumferential edge thereof. The central aperture 332 of the rounded protrusion 330 has the same dimensions as the openings 316 and 326 on the inner frame 302 and filter element 306, respectively. The elements of the cover plate 304 can further be described in terms of an outer side and an inner side wherein the outer side of the cover plate 304 faces away from the housing 21, and the inner side faces the filter element 306.

In assembly as shown in FIGS. 1–3, the filter frame assembly 300 is stacked as illustrated in FIG. 3 and retained by a fastening member 338 which is inserted within the aligned aperture 332 of the cover plate 304, opening 326 of the filter element 306 and the central opening 316 of the frame 302. The fastening member 338 can be threaded within a corresponding socket in the exterior of the housing 21 or welded to the exterior surface of the housing 21. Alternatively, the fastening member 338 can take the form of a rivet which is secured to the exterior surface of housing 21 in conventional manner or any other suitable fastening means which will securely affix the filter frame assembly 300 to the exterior of the housing 21. The frame 302 rests against the outer surface of the housing section 21, but the wall 336 is dimensioned such that a gap 340 exists between the lowest edge thereof and the exterior surface of the housing 21. Preferably, the frame 302 is spaced from the vent openings 44 in order to avoid back pressure caused by an immediate blockage of the opening. The outer rim 312 of the frame 302 rests securely against the outer surface of the housing section 21. The filter element 306, on the other hand, can be fixedly attached to the interior surface of the frame 302, preferably by heat staking it to the continuous inner side surface of the hub 314 and the cylindrical wall 312. The result is that air passing through the frame filter assembly 300 is compelled to follow a tortuous path through vent opening 44, the open grid of the frame 302, the pores of the filter element 306, the notches 322 in the outer rim of the frame 302, and through the gap 340 between the cover plate 304 and the housing 21. This tortuous pathway and the filter element 306 ensure that dirt, debris, ice, salt, paint, and the like will not clog the filter or the vent openings.

Aside from the filtered vent openings 44, the only other port by which atmospheric contaminants can enter the service chamber 30 is shown in FIG. 1 as central opening 34 in the push rod guide 42 through which the push rod reciprocates. A bellows assembly 400 is mounted adjacent the exterior side of the central opening 34 to prevent air and contaminants from entering through the central opening 34.

As shown in FIGS. 1 and 6, the bellows assembly 400 comprises a mounting bracket 402, a flexible boot such as bellows 404 and a clamp 406. The mounting bracket 402 is generally a stamped rigid metal piece while the bellows is constructed from a flexible resilient plastic material such as HYTREL, manufactured by DuPont.

The mounting bracket 402 comprises an outer annular ring 408 and an inner annular ring 410. The inner annular ring 410 extends radially inwardly from the outer annular ring 408 and is vertically offset in a terraced fashion therefrom.

The bellows 404 comprises a cylindrical body 412 having several radially-extending corrugations 414 located around the circumference of the body 412. A first end of the bellows 404 includes an outwardly-curved radial flange 416 which defines a circular lip 418. A second end of the bellows 404 includes an axially extending flange 420 having a circular lip 422.

As shown in FIG. 1, the bellows assembly 400 can be assembled to the housing 21 and push rod 18 by axially locating the bellows 404 over the push rod 18 such that the circular lip 418 of the radial flange 416 abuts the end wall of the housing 21 and extends completely over the central opening 34. The mounting bracket 402 is then axially located over the push rod 18 and the bellows 404 such that the outer annular ring 408 abuts the end wall of the housing 21 and the inner annular ring 410 pinches the radial flange 416 of the bellows 404 between the inner annular ring 410 and the end wall of the housing 21. The mounting bracket 402 may then be secured to the housing 21 such as by welding to fixably retain the bellows 404 to the housing 21. The opposite end of the bellows 404 is then fixed to the push rod 18 such as by a conventional clamp band 424 with a threaded fastener 426.

In operation, the bellows assembly 400 acts to prevent air from entering the second chamber 30 through the central opening 34 and ensures that atmospheric air will virtually enter the second chamber 30 only through the vent openings 44 after first being filtered by the filter assembly 300. Corrugations 414 in the bellows 404 permit the bellows 404 to contract and expand with reciprocations of the push rod 18 without breaking.

Figure 7:
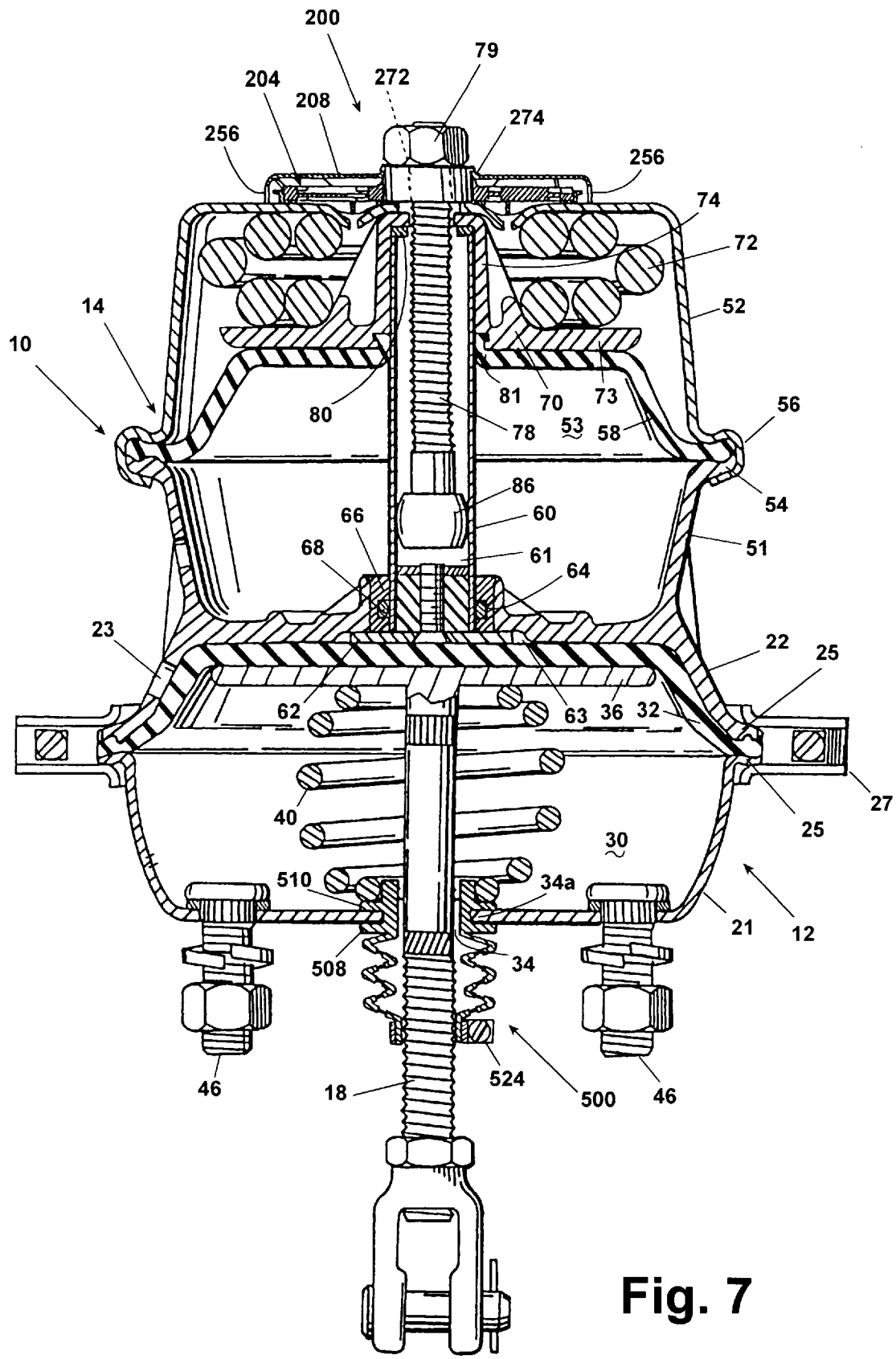
FIG. 7 is a cross-sectional view of a spring brake actuator having a second embodiment of the filtered service side vent assembly according to the invention.

Turning to FIG. 7, an alternate embodiment of a filter assembly is shown generally at 500. The filter assembly 500 comprises a mounting flange 502, a tapering bellows 504 and a second mounting flange 506.

Figure 8:
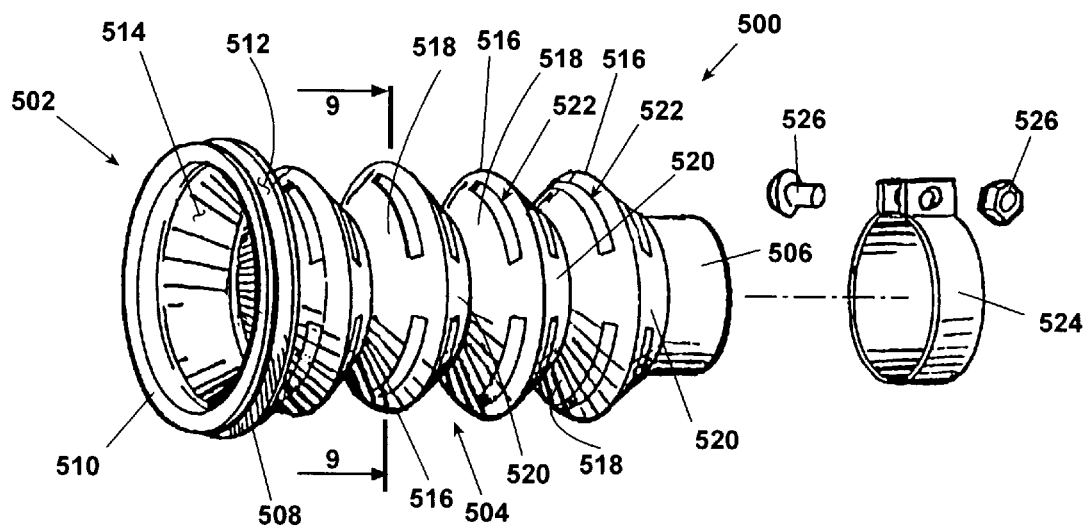
FIG. 8 is an exploded view of the filtered vent assembly of FIG. 7.
Figure 9:
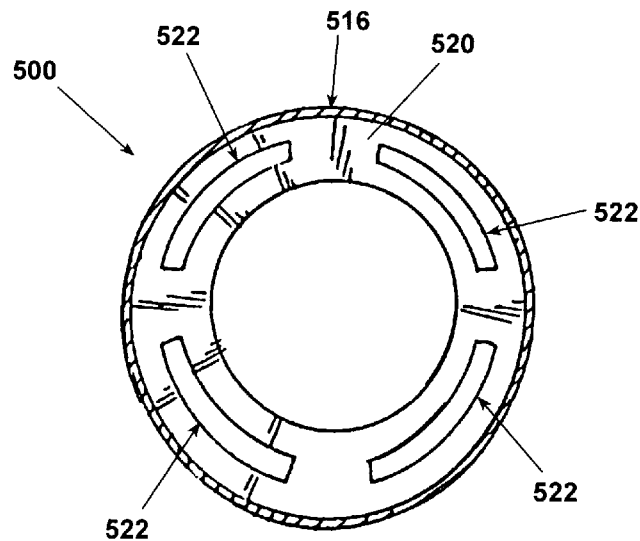
FIG. 9 is a cross-sectional view of the filtered vent assembly taken along lines 9—9 of FIG. 8.

As shown in FIG. 7 and in greater detail in FIGS. 8–9, the mounting flange 502 comprises first and second radially-extending flanges 508 and 510, respectively, between which is defined an annular groove 512. The annular groove 512 corresponds at an approximate inner diameter to the diameter of the central opening 34 in the housing section 21. The first mounting flange 502 further includes an axially-disposed central aperture 514 which diameter is slightly greater than the outer diameter of the push rod 18.

The bellows 504 extends away from the first mounting flange 502 and is provided with several radially-extending corrugations 516. The second mounting flange 506 comprises an annular lip having an inner diameter equal to or just slightly greater than the outer diameter of the push rod 18.

Each corrugation 516 comprises a leading side 518 and a trailing side 520 as shown in FIG. 8. The leading and trailing sides 518 and 520 each include an integrally molded flow passage 522. Each flow passage 522 comprises a treated section of expanded polytetrafluoroethylene (PTFE), such as Gore-Tex®, preferably formed in a thin sheet or film-like section and integrally molded within the leading and trailing sides 518 and 520 of each corrugation 516.

In assembly, as shown in FIG. 7, the first mounting flange 502 of the filter assembly 500 is axially located over the push rod 18 and positioned adjacent the central opening 34 of the housing section 21. The first mounting flange 502 is partially received within the central opening 34 of the housing section 21, such that the inner circumferential edge 34a of the housing 21 is slidably within the annular groove 512. An adhesive or other fastening may be used to further secure the first mounting flange 502 to the inner circumferential edge 34a of the central opening 34. However, it has been found that further fastening means may not be necessary when there is a tight fit of the first mounting flange 502 to the central opening 34. The inner surface of the second flange 510 of the first mounting flange 502 also functions as a spring seat to aid in the centering and proper location of the service brake return spring 40 within the second chamber 30, thus aiding in further retaining the first mounting flange 502 to the inner circumferential edge 34a of the housing 21. It should also be noted that the housing 21 of this embodiment does not require any vent openings 44 because all air is divided to pass through the filter assembly 500. The second mounting flange 506 is axially positioned around the push rod 18 and fixably secured thereto by a fastening means such as the hose clamp 524 and threaded fastener 526 as shown in FIGS. 7–8. When this assembly is complete, the only path by which filler air may enter and exit to and from the second chamber 30 is through the breathable flow passages 522 disposed on the leading and trailing sides 518 and 520 of each corrugation 516 on the bellows 504.

During operation, it will be understood that as air is drawn into the second chamber 30 when the return spring 40 expands as to return the service diaphragm into its retracted position adjacent housing section 22, contaminants in the atmosphere will be trapped by the filter assembly 500. Conversely, as air is expelled from the second chamber 30 when the service diaphragm 32 urges the push rod 18 outwardly of the housing 21 due to the introduction of compressed air through port 23, air in the chamber 30 is forced back through the filter assembly 500 and will effectively clean it, expelling the contaminants trapped by the filter assembly into the atmosphere. Thus, the interior of the chamber 30 is maintained substantially free of contaminants, regardless of operation of the brake actuator. The mountings of the first and second mounting flanges 502 and 506, respectively, are sufficiently tight to prevent any contaminants from entering the second chamber 30 or to prevent any leakage therefrom. The flow passage membranes 522 effectively trap any contaminants on their outer surface and only allow filtered clean air to enter the second chamber 30.

Figure 10:
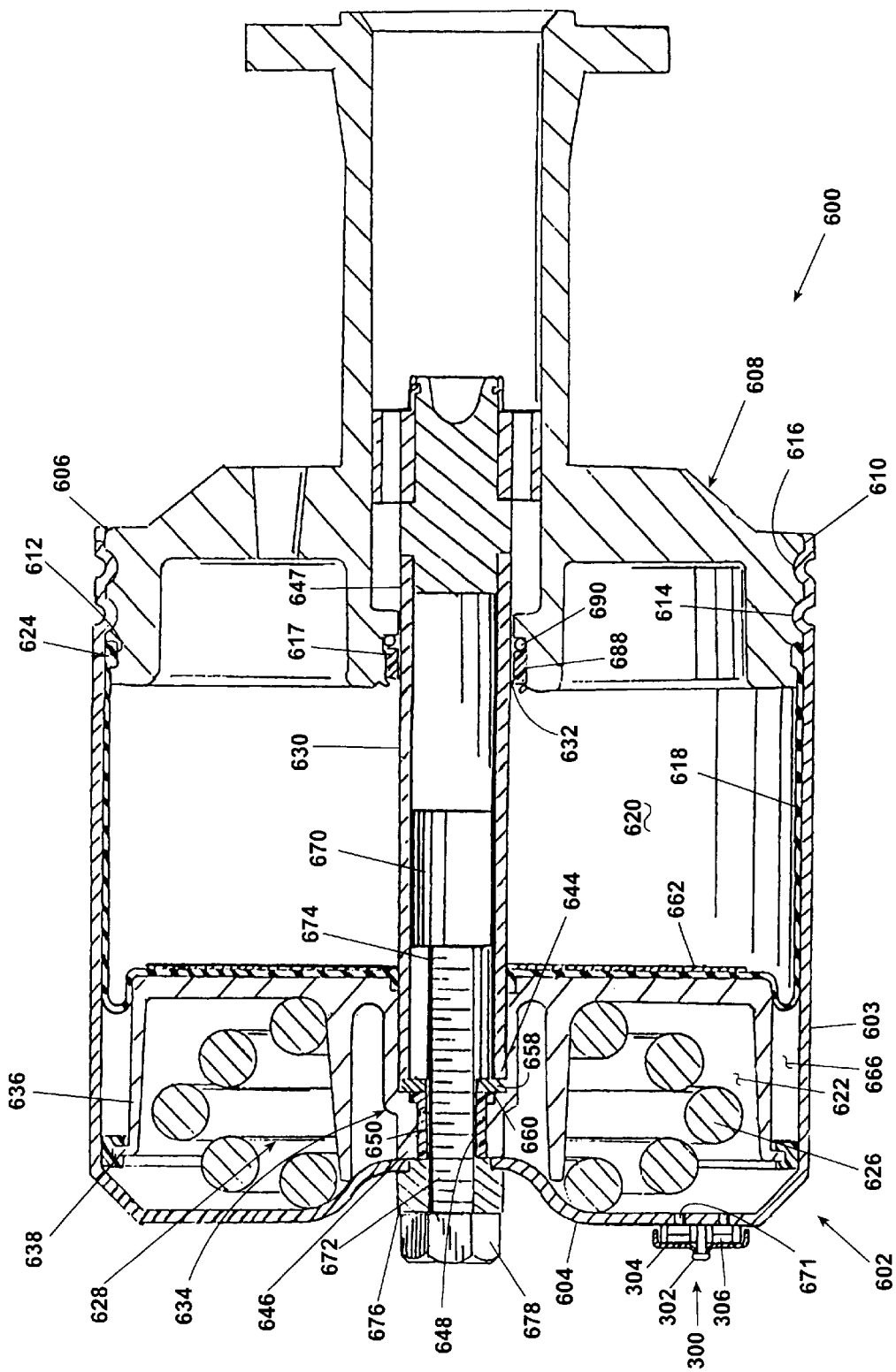
FIG. 10 is a cross-sectional view of a piston brake actuator illustrating a third embodiment of the invention.

Referring to FIG. 10, an alternate embodiment of a fluid-actuated spring brake 600 for attachment to an existing braking system in a vehicle (not shown) to provide emergency and parking brake service is shown. The spring brake actuator 600 comprises a cylindrical head 602 formed of steel and having a cylindrical portion 603, an end wall 604 and an opposite open end 606. A cast aluminum or steel adapter 608 is received within the head open end 606. The adapter 608 has an annular outer wall 610 bearing three annular grooves 612, 614 and 616 and a portion of the head 602 is deformed into the two outermost annular grooves 614 and 616 to permanently secure the head 602 to the adapter 608. The adapter 608 has a central tubular guide which has an internal bore 670.

A rolling lobe diaphragm 618 divides the interior chamber of the brake actuator 600 into a pressure chamber 620 and a spring chamber 622. The shape of the diaphragm 618 is generally tubular with one end terminating in an annular bead 624. The innermost annular groove 612 receives the annular bead 624 so that the diaphragm 618 is held between the adapter 608 and the head 602 in a sealing relationship. A plastic pressure plate 628 is attached to the diaphragm 618 in the spring chamber 622. A strong compression spring 626 extends between the head end wall 604 and the pressure plate 628, providing a bearing surface for the spring 626. A hollow actuator rod 630 is press-fit onto the pressure plate 628 and extends out of the pressure chamber 620 through an opening 632 in the adapter 608. Bearing 688 and O-ring 690 are mounted in an annular groove 617 to guide and seal the actuator rod 630 as it passes through an opening 632 to provide an airtight seal between the actuator rod 630 and the adapter 608.

The pressure plate 628 has a flat plate portion 629, a central tubular flange 634 and an inner tubular hub 646 which receives the actuator rod 630. It also has an annular rim 636 which extends axially toward the head end wall 604. The rim 636 terminates in an annular guide flange 638 which extends radially outwardly from the rim 636 toward the cylindrical portion 603 of the head 602. As seen in FIG. 1, the pressure plate return flange 636 is spaced radially inwardly from the cylindrical portion 603 of head 602 to form an annular gap 666. The guide flange 638 has a series of through holes (not shown) to vent annular gap 666. Flange 638 bears against inside cylindrical portion 603 of head 602 in reciprocal motion. The inner tubular hub 646 defines a first bore 648 which terminates in a shoulder 660 and a second bore 650. The exterior diameter of the inner tubular hub 646 is slightly less at an upper portion which forms the bore 650 than at a lower portion which forms the first bore 648.

The actuator rod 630 comprises a proximal end 644 affixed to the pressure plate 628 and a distal end 647 extending from the actuator rod opening 632. The actuator rod proximal end 644 is received in the pressure plate first bore 648. A steel washer 658 lies against the shoulder 660. The actuator rod proximal end 644 is press fit in the first bore 648, bearing against the washer 658 to hold the washer 658 securely in place.

A disc-shaped retainer plate 662 and the pressure plate 628 sandwich the diaphragm 618 to secure the diaphragm 618 to the pressure plate 628. Several pins (not shown) pass through mating holes (not shown) in the rolling diaphragm 618 and the retainer plate 662 and are ultrasonically swaged to the underside of retainer plate 662 to lock the pressure plate 628, rolling lobe diaphragm 618 and retainer plate 662 together. Alternatively, threaded fasteners (not shown) can be used to join the pressure plate 628, rolling diaphragm 618 and retainer plate 662 together.

The compression spring 626 is nested in the pressure plate 628 between the annular rim 636 and the central tubular flange 634. A collar 676 is mounted to the end wall 604 and has a threaded bore in which is threaded a caging bolt 672. A hex nut 678 is staked onto the outer end of the caging bolt 672 for rotation of the bolt 672 by means of a wrench. A head 670 is formed on the inner end of the bolt 676 to engage the washer 658 and manually retract the diaphragm 618 and pressure plate 628 to compress the spring 626 to release brake pressure if desired, when in the emergency or parking mode.

During normal operation of the brake actuator 600, the actuator rod 630 will be in the fully retracted position by means of compressed air which is maintained in the pressure chamber 620. When the compressed air is exhausted, the compression spring 626 expands to force the pressure plate 628 and integrally attached actuator rod 630 downwardly through the adapter opening 632 to actuate a brake (not shown), in emergency or parking mode. The guide flange 638 and guide 640 guide the movement of the pressure plate 628 as it reciprocates within the head 602. As the pressure plate 628 moves toward the adapter 608, the diaphragm 618 folds over on itself or rolls, so as to be received within the annular gap 666. When the brake is to be released, compressed air is once again introduced in the pressure chamber 620. The force of the compressed air against the rolling diaphragm 618 and retainer plate 662 overcomes the compression force of the spring 626 and returns the pressure plate 628 and actuator rod 630 to the position seen in FIG. 10.

A vent opening 671 is located along the end wall 604 of the cylindrical head 602. A filter assembly 300 as shown in FIGS. 2–5 is mounted over the vent opening 671 in a manner described above.

In operation, as the pressure plate 628 reciprocates during the operation of the brake, air is drawn in and out of the vent opening 671 and thereby through the filter assembly 300. As disclosed in the previous embodiments of this invention, the filter assembly 300 mounted over the vent opening 671 prevents contaminants from entering the spring chamber 622 and damaging the compression spring 626.

Figure 11:
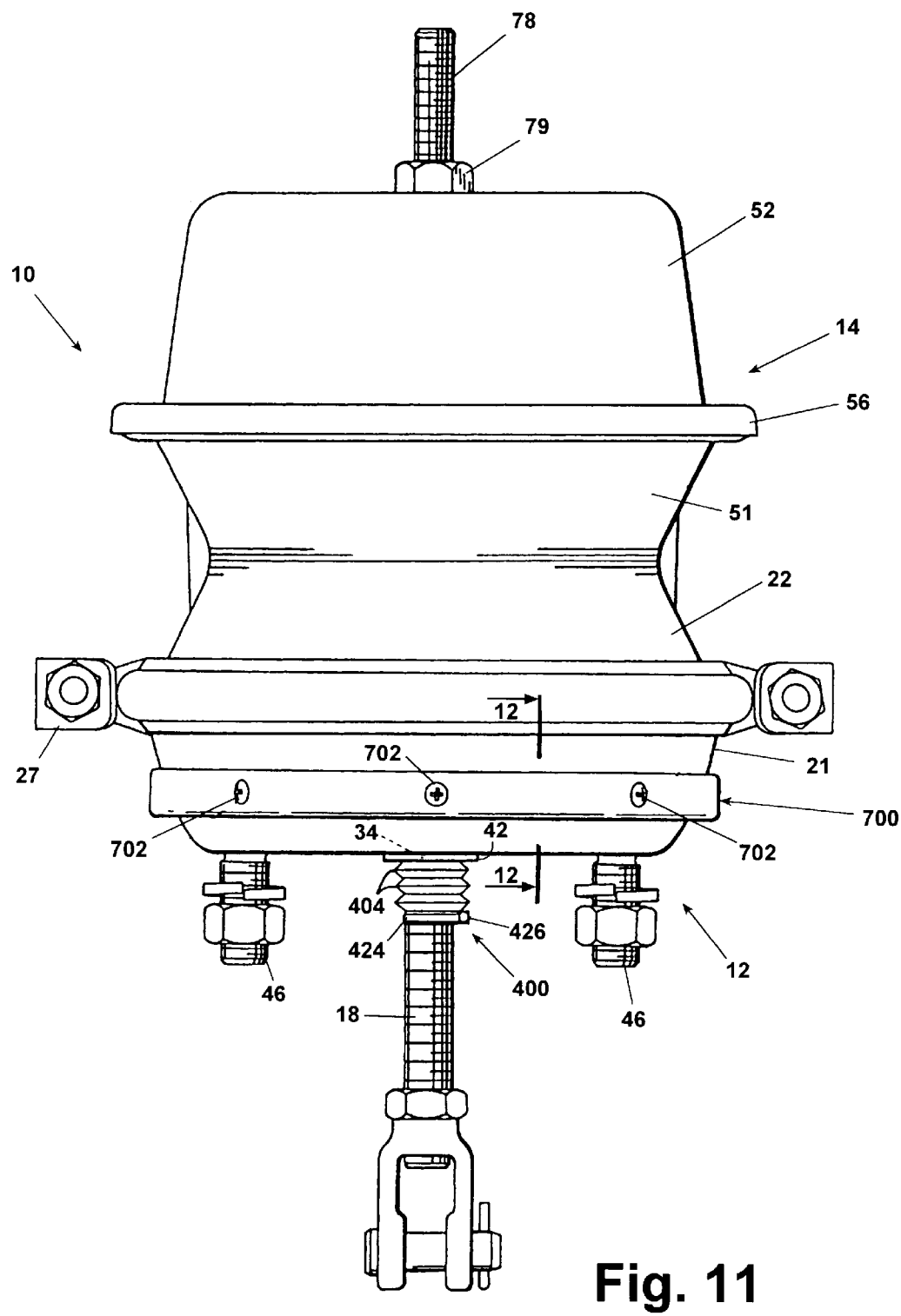
FIG. 11 is a plan view of a spring brake actuator with a fourth embodiment of the filtered vent assembly according to the invention.
Figure 12:
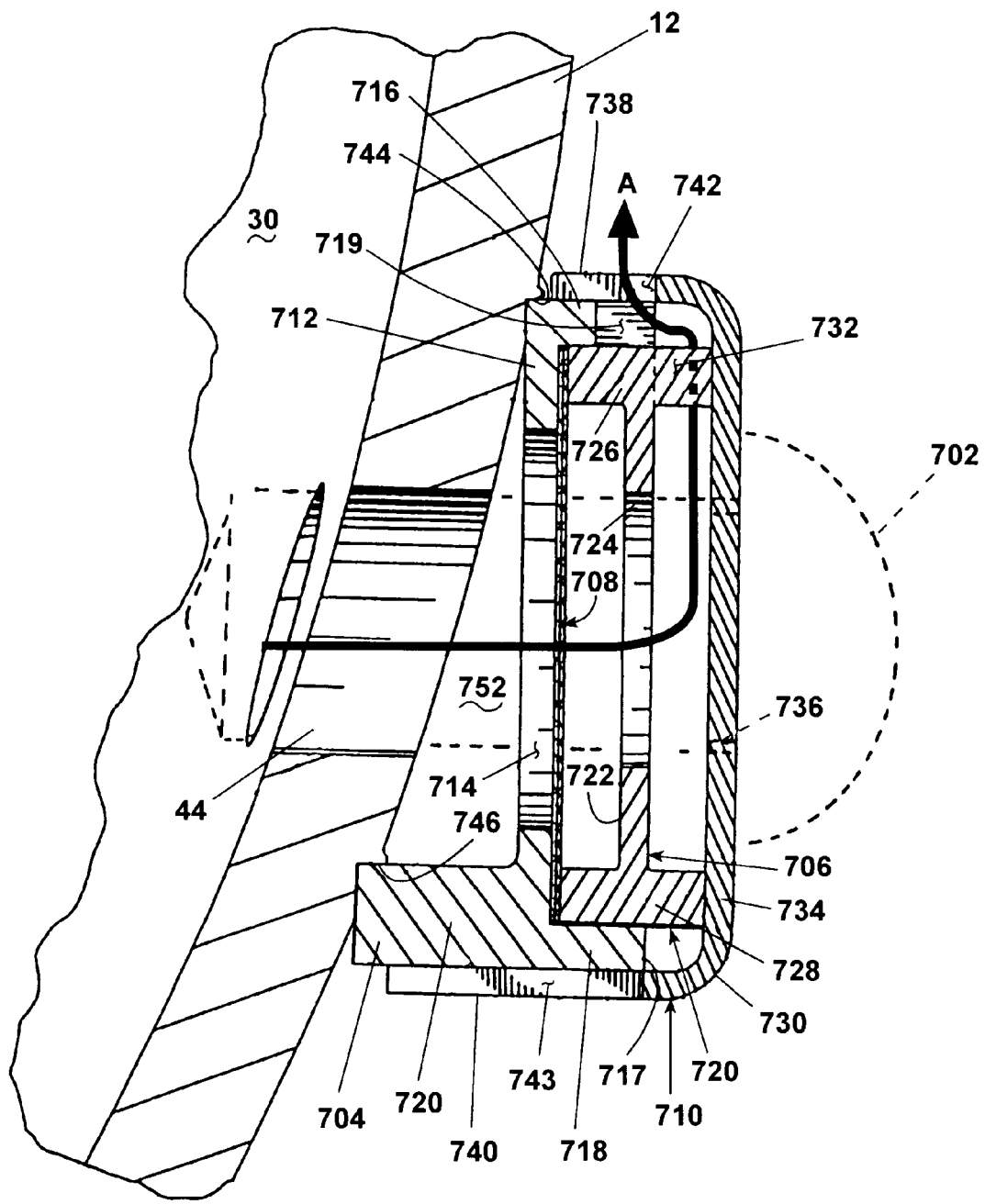
FIG. 12 is a cross-sectional view of the spring brake actuator of FIG. 11 taken along line 12—12.

Another alternative embodiment of the service side filter assembly is shown in FIGS. 11 and 12. The filter assembly, shown generally at 700, is shown as an annular ring disposed over the vent openings 44 in the housing section 21 in a manner which defines a tortuous air path shown by the arrow A extending between the air chamber 30 and the exterior atmosphere. In this embodiment, the vent openings 44 (of which there may be several) are disposed in a spaced radial relationship around a common horizontal circumference of the housing section 21 so that all of the vent openings 44 may be covered by a single annular housing. As shown in FIG. 11, the filter assembly 700 is mounted to the housing portion 21 by several fasteners 702. This structure, as in the previous embodiments, requires all of the air entering and exiting the service chamber 30 to pass through the filter assembly 700 while simultaneously protecting the vent openings 44 and the interior chamber 30 from dirt, debris, ice accumulation, paint, salt and the like. It will be understood that as air is drawn into the chamber 30 when the return spring 40 expands, contaminants in the atmosphere will be trapped by the filter assembly 700. Conversely, as air is expelled from the chamber 30, when the service diaphragm 32 expands due to the introduction of compressed air, it is forced back through the filter assembly 700 and will effectively clean it, expelling the contaminants into the atmosphere. Thus, the interior chamber 30 is maintained substantially free of contaminants. Because the vent openings 44 in this embodiment are disposed in the radial relationship as described, a single filter assembly 700 can be disposed around the exterior of the housing 21 regardless of the number of vent openings 44 present. The filter assembly 700 comprises an inner frame 704, an outer frame 706, a filter element 708 and a cover plate 710.

The inner frame 704 comprises an annular plate 712 having several spaced apertures 714 located therein. The annular plate 712 further includes a pair of outwardly-extending radial flanges 716 and 718 located at opposite upper and lower edges of the plate 712 and an inwardly-extending radial flange 720 oppositely disposed along an exterior edge of the annular plate 712 adjacent the radial flange 718. In this embodiment, "upper" and "lower" are relative to the orientation of FIGS. 11 and 12 and do not reflect the orientation of the respective structures relative to the orientation of the spring brake actuator in use. The distal portions of the flanges 716 and 718 include a crenelated portion defined by alternating solid and notched portions shown at 717 and 719, respectively. The flanges 716 and 718 of the inner frame 704 further define right-angle shoulders 744 and 746, respectively.

The outer frame 706 comprises an annular plate 722 having several spaced apertures 724 disposed therein. The annular plate 722 further includes a pair of flanges 726 and 728 which are located at each outer edge of the annular plate 722 and extend both radially inwardly and outwardly from the annular plate 722 so that the outer frame 706 has an H-shaped cross-section as shown in FIG. 12. The distal portion of the flanges 726 and 728 which extend outwardly from the outward surface of the annular plate 722 include a crenelated surface defined by alternating solid and notched portions, shown by example at 730 and 732, respectively. The outer frame 706 is sized to be received between the flanges 716 and 718 adjacent the outer surface of the annular plate 712 of the inner frame 704.

The filter element 708 is an annular gas-permeable strip preferably constructed from a porous-polymer having a hydrophobic and oleophobic properties and a pore size of about 1 micron. An acceptable filter element, as in the previous embodiments, comprises a Gore-Tex® membrane sized substantially to the outside diameter of the annular plate 712 of the inner frame 704 and having a width which substantially corresponds to the distance between the interior surfaces of the radial flanges 716 and 718 thereof.

The cover plate 710 is an annular, stamped metal channel having a substantially U-shaped cross-section defined by an outer wall 734 having several apertures 736 disposed therein. The outer wall 734 terminates at inwardly-extending upper and lower sidewalls 738 and 740, respectively. One or both of the upper and lower sidewalls 738 and 740 can include several spaced apertures shown in FIG. 12 at 742 and 743, respectively. The aperture 736 in the cover plate 710 are axially aligned with the vent openings 44 or sockets (not shown) in the housing portion 21. The aperture 724 in the outer frame 706 and the aperture 714 in the inner flame 704 also are of sufficient diameter to permit a fastener 702 to pass therethrough.

In assembly, as shown in FIGS. 11–12, the inwardly-extending portions of the flanges 726 and 728 of the outer frame 706 are received within the outwardly-extending portions of the flanges 716 and 718 of the inner frame 704 in a stacked relationship with the filter element 708 retained therebetween. The cover plate 710 is mounted to one or both of the inner frames 704 and the outer frame 706 to complete the assembly of the filter assembly 700. The filter assembly 700 is then mounted to the housing 21 by one or more fastening members 702, each of which is inserted within an aligned aperture 736 of the cover plate 710, aperture 724 of the outer frame 706 and the aperture 714 of the inner frame 704. The fastening member 702 can be threaded within a corresponding vent opening 44 or socket (not shown) in the exterior of the housing portion 21 or welded to the exterior surface of the housing 21. Alternatively, the fastening member 702 can take the form of a rivet which is secured to the exterior surface of housing 21 in a conventional manner or any other suitable fastening means which will securely affix the filter assembly 700 to the exterior of the housing 21. The alignment of the filter assembly 700 with respect to the housing 21 can be further enhanced by providing a pair of annular grooves 748 and 750 on either side of the vent openings 44 so that the shoulders 744 and 746 of the inner frame 704 can be received. The inner frame 704 rests against the outer surface of the housing portion 21, but the radial flange 720 causes a gap 752 to exist between the lowest edge of the annular plate 712 and the exterior surface of the housing portion 21. Preferably, the inner frame 704 is spaced from the vent openings 44 in order to avoid back pressure caused by an immediate blockage of the vent opening 44. The outer frame 706 is spaced from the inner frame 704 in a similar fashion. The result is that air passing through the filter assembly 700 is compelled to follow a tortuous path (arrow A) through vent opening 44, the aperture 714 in the inner frame 704, the pores of the filter element 708, the aperture 724 in the outer frame 706, the notched portions 732 of the outer frame 706, the notched portions 719 of the inner frame 704, and through the apertures 742 and 743 in the cover plate 710. This tortuous pathway and the filter element 708 insure that dirt, debris, ice, salt, paint and the like will not clog the filter or the vent openings 44.

Aside from the filtered vent openings 44, the only other port by which atmospheric contaminants can enter the service chamber 30 is shown in FIG. 11 as central opening 34 in the push rod guide 42 through which the push rod 18 reciprocates. A bellows assembly 400, as shown in FIGS. 1 and 6, is mounted adjacent the exterior side of the central opening 34 to prevent air and contaminants from entering therethrough as shown in the figures and description for the service brake of FIG. 1.

The invention encompasses other variations and modifications not illustrated in the drawings, but clearly evident to one skilled in the art. For example, the filter element can be entirely separated from the housing and in communication with a single vent opening or multiple vent openings by one or more conduits, as the case may be. In this manner, the filter element can be positioned in a protected area of the vehicle chassis.

It will be understood that other variations and modifications of the foregoing embodiments may be devised by those skilled in the art without departing from the scope of the invention as defined by the appended claims.

We claim:

1. In a service brake actuator for a vehicle comprising:
    an enclosed housing (21,22),
    a movable member (32), disposed within the housing (21,22), and dividing the interior thereof into a first chamber (29) and a second chamber (30), and reciprocally movable to and from a first position therein in response to the delivery and exhaust of pressurized fluid to and from the first chamber (29), respectively, the housing (21,22) having at least one vent opening (44) establishing fluid communication between the second chamber (30) and atmosphere,
    an actuator rod (18) extending from the second chamber (30) through the housing (21,22), and operably connected between the movable member (32) and a brake, and movable therewith for operation of the brake, the improvement comprising:
        a gas permeable membrane (306) mounted to the housing (21,22) in fluid communication with the at least one vent opening (44) and adapted to filter liquid and solid particles from air passing therethrough, and
        a filter assembly (300) covering the membrane (306) and defining a tortuous air passage to the exterior of the housing (21,22),
        whereby upon the movement of air through the vent opening (44) into the second chamber (30) as the movable member (32) is urged away from the first position, the membrane (306) will filter solid and liquid particles from the air passing into the second chamber (30) and help maintain the second chamber (30) substantially free of contaminants.

2. A brake actuator according to claim 1 wherein the membrane is hydrophobic.

3. A brake actuator according to claim 1 wherein the membrane is oleophobic.

4. A brake actuator according to claim 1 wherein the membrane comprises expanded polytetrafluoroethylene.

5. A brake actuator according to claim 1 wherein the filter assembly (300) comprises a frame (302) and a shell (304), and the membrane (306) is disposed between the frame (302) and the shell (304).

6. A brake actuator according to claim 5 wherein the frame (302) comprises radial spokes (310) and an upstanding peripheral rim (312).

7. A brake actuator according to claim 5 wherein the membrane (306) is disc-shaped.

8. A brake actuator according to claim 1 wherein the first position is a brake actuating position.

9. A brake actuator according to claim 1 wherein the first position is a brake releasing position.

10. In a brake actuator for a vehicle comprising:
    an enclosed housing (21,22),
    a movable member (32) disposed within the housing (21,22) and dividing the interior thereof into a first chamber (29) and a second chamber (30) and reciprocally movable to and from a first position therein in response to the delivery and exhaust of pressurized fluid to and from the first chamber (29), respectively, the housing (21,22) having an opening (34) in communication with the second chamber (30), and
    an actuator rod (18) extending through the opening (34), operably connected to the movable member (32) and movable therewith for operation of a brake, the improvement comprising:
        said opening (34) being the principal means for air to enter or exit the second chamber (30),
        a gas permeable membrane (522) mounted to the housing in communication with the opening (34) and adapted to filter liquid and solid particles, and
        a flexible boot (500) covers the opening (34) and the filter element (522) is disposed in the boot,
        whereby upon the movement of air through the opening (34) into the second chamber (30) as the movable member (32) is urged away from the first position, the membrane (522) will filter solid and liquid particles from the air moving into the second chamber (30) and help maintain the second chamber (30) substantially free of contaminants.

11. A brake actuator according to claim 10 wherein the membrane (522) is hydrophobic.

12. A brake actuator according to claim 10 wherein the membrane (522) is oleophobic.

13. A brake actuator according to claim 10 wherein the membrane (522) comprises expanded polytetrafluoroethylene.

14. A brake actuator according to claim 11 wherein the boot (500) comprises a rubber bellows (504) with at least one accordion fold (516) with an aperture therethrough, and the membrane (522) covers the aperture in the fold.

15. A brake actuator according to claim 14 wherein the membrane (522) is hydrophobic.

16. A brake actuator according to claim 14 wherein the membrane (522) is oleophobic.

17. A brake actuator according to claim 14 wherein the membrane (522) comprises expanded polytetrafluoroethylene.

18. In a service brake actuator for a vehicle comprising:
    an enclosed housing,
    a movable member, disposed within the housing, and dividing the interior thereof into a first chamber and a second chamber, and reciprocally movable to and from a first position therein in response to the delivery and exhaust of pressurized fluid to and from the first chamber, respectively, the housing having at least one vent opening establishing fluid communication between the second chamber and atmosphere,
    an actuator rod extending from the second chamber through the housing, and operably connected between the movable member and a brake, and movable with the movable member for operation of the brake, the improvement comprising:
        a gas permeable filter element mounted to exterior of the housing in fluid communication with the at least one vent opening and adapted to filter liquid and solid particles from air passing therethrough,
        a filter assembly covering the filter element wherein the filter assembly defines a tortuous air passage from the atmosphere to the filter element,
        whereby upon the movement of air through the vent opening into the second chamber as the movable member is urged away from the first position, the filter element will filter solid and liquid particles from the air passing into the second chamber and help maintain the second chamber substantially free of contaminants.

19. A brake actuator according to claim 18 wherein the filter comprises a hydrophobic filter element.

20. A brake actuator according to claim 18 wherein the filter comprises an oleophobic filter element.

21. A brake actuator according to claim 18 wherein the filter element comprises expanded polytetrafluoroethylene.

22. A brake actuator according to claim 20 wherein the filter assembly comprises a frame and a shell, and the filter element is disposed between the frame and the shell.

23. A brake actuator according to claim 22 wherein the frame comprises radial spokes and an upstanding peripheral rim.

24. A brake actuator according to claim 22 wherein the filter element is disc-shaped.

25. A brake actuator according to claim 18 wherein the first position is a brake actuating position.

26. A brake actuator according to claim 18 wherein the first position is a brake releasing position.

27. A brake actuator according to claim 18 wherein the filter element is a membrane.

* * * * *